(12) United States Patent
Zhang

(10) Patent No.: US 7,512,594 B2
(45) Date of Patent: Mar. 31, 2009

(54) COMPUTER CONTROLLED USER DISPLAY INTERFACE WITH A TREE TO REPRESENT DATA RELATIONSHIPS IN A DATABASE

(76) Inventor: Lixin Zhang, P.O. Box 0819, Cupertino, CA (US) 95014-0819

( * ) Notice: Subject to any disclaimer, the term of this patent is extended or adjusted under 35 U.S.C. 154(b) by 353 days.

(21) Appl. No.: 11/205,579

(22) Filed: Aug. 17, 2005

(65) Prior Publication Data

US 2007/0043699 A1 Feb. 22, 2007

(51) Int. Cl.
*G06F 17/30* (2006.01)
*G06F 7/00* (2006.01)

(52) U.S. Cl. ............... 707/3; 707/102; 707/201; 707/8

(58) Field of Classification Search ............ 707/3, 707/102
See application file for complete search history.

(56) References Cited

U.S. PATENT DOCUMENTS

| | | | | |
|---|---|---|---|---|
| 5,546,529 A * | 8/1996 | Bowers et al. | ............ | 715/848 |
| 6,058,391 A * | 5/2000 | Gardner | ............ | 707/4 |
| 6,356,286 B1 * | 3/2002 | Lawrence | ............ | 715/853 |
| 6,529,915 B1 * | 3/2003 | Owens et al. | ............ | 707/103 R |
| 6,938,041 B1 * | 8/2005 | Brandow et al. | ............ | 707/10 |
| 7,178,109 B2 * | 2/2007 | Hewson et al. | ............ | 715/790 |
| 2002/0063734 A1 * | 5/2002 | Khalfay et al. | ............ | 345/744 |

OTHER PUBLICATIONS

Bert Scalzo, "TOAD Handbook", 2003, pp. 219-222, Sams Publishing. "TOAD" is a product from Quest Software, Inc (www.quest.com).

* cited by examiner

*Primary Examiner*—Kuen S Lu
*Assistant Examiner*—Binh V Ho
(74) *Attorney, Agent, or Firm*—Schein & Cai LLP; Douglas E. Mackenzie

(57) ABSTRACT

A computer controlled user display interface with a tree that has a plurality of nodes to represent table records in relational databases, and the parent-child arrangements between those nodes to represent relationships between the table records. The nodes can either represent one record or a list of records from a table. A user can select the expand icon in front of a node representing one record to display all its related records as sub-nodes of this node. The related records are defined either by foreign key constraints or user-defined table relationships. The system also includes an implementation to generate search queries dynamically based on the table relationships. A preferred display layout will also include a grid next to the tree to display the table records with complete data for all columns when a user selects a tree node. In this manner, the user can execute a search query to populate the tree with initial set of table records, and then keep expanding the nodes to browse all the related table records.

4 Claims, 5 Drawing Sheets

Patent Application of Lixin Zhang for "Method and system for visualizing data relationships using tree and grid layouts"

COMPUTER CONTROLLED USER DISPLAY INTERFACE WITH A TREE TO REPRESENT DATA RELATIONSHIPS IN A DATABASE

CROSS-FEFERENCE TO RELATED APPLICATIONS

Not Applicable

FEDERALLY SPONSORED RESEARCH

Not Applicable

SEQUENCE LISTING OR PROGRAM

Please refer to flow charts FIGS. 3, 4, 5.

DEFINITION OF TERMS

| Term | Definition |
|---|---|
| Tree, or Tree layout | A graphical component with its content displayed as hierarchical nodes. See 1.1 in FIG. 1. The tree and tree layout are used interchangeably in this invention. |
| Grid, or Grid layout | A graphical component with its content displayed as a two-dimension table. See 1.2 in FIG. 1. The grid and grid layout are used interchangeably in this invention. |
| Database | A computer system to store relational data, their structure and relationship information. |
| Database Table | A two-dimensional data structure to hold data in a database. Referred as "table" in this invention. |
| Table record | A row of data in a database table. |
| Primary key | A table has one primary key, which is a set of columns whose value can uniquely identify a table record. |
| Data relationship | The logical relationship between data stored in two tables. They can be defined as foreign key constraints between two tables. As example, a "customer" table relates to "purchase order" table as a customer can have many purchase orders. The data relationship can be defined as a foreign key on "purchase order" table with its customer_id column referring to the primary key of customer table. |
| SQL | A query language allows users to retrieve and modify data in a database. |
| SQL query | A statement written in SQL language to retrieve data from database. An example could be "select * from customer". |
| Query result | A two-dimension data structure returned by executing a SQL query, which is a subset of data in a database table. |
| Schema information of a query result | The schema information of a query result comprises following information of the query result: (1) the primary key, (2) the column names, and (3) data relationship information with respect to other related tables. |
| Java language | An object-oriented programming language. |
| JDBC | The standard library allows programs written in Java to access relational database. |

BACKGROUND OF THE INVENTION

1. Field of Invention

This invention relates to retrieving and rendering data in relational databases, specifically to how to visualize the data relationship.

2. Background of the Invention

Most software applications are implemented in object-oriented languages, and process data in relational databases. Usually the data from one object is saved to one database table. Objects are related. Users routinely need to retrieve the data in an object and several of its related objects when developing object-oriented applications. To retrieve these data, several SQL queries have to be executed against different database tables. It is tedious and time consuming to write, maintain and execute these queries manually.

Several existing products have features to help users to retrieve and rendering related data. The "Toad" product from Quest Software (www.guest.com) has a tool called master-detail browser. It has five grids arranged vertically. Each grid has a list box above it to allow users to pick a table. Users can pick a table for the top grid to display all the table records data in that grid. Then, users can highlight a record in the first grid, and pick a related table from the list box above the second grid to display only the related table records in the second grid. Similarly, users can highlight a record in second grid, and pick a table for the third grid, and keep going.

The major disadvantage of this method is that users are not able to see a whole picture of these relationships. Assuming a purchase order table has related data in line item table, shipping information table, and tax information table, the tool does not allow users to see these relationships at the same time. Users have to pick one of the related tables in a list box, see its data, pick another one, see its data, and so on.

The second disadvantage is that the first grid displays all data in the selected table, which could be hundreds and thousands of records for a normal table. It is time consuming to load and render these data. Users normally want to see only a few of these table records.

The "DbSpider" product from "Diligent it Solutions Ag" (www.diligent-it.com) allows users to execute one SQL query, and display the query result and related data in one tree layout. Each tree node represents a table record, with the table record data displayed vertically as column name and column value pairs. A button is. displayed if a column holds a key value referring to another table. Users can click the button to open another tree node containing a related table record.

The major disadvantage of this method is that it layouts the table data and data relationship together. Usually a table has many columns, and one table could relate to several tables, and each of these tables could relate to other tables. This will make the graph very large, and hard for users to navigate.

Another disadvantage is that to display related table records, users have to look for the buttons in the vertical column name and column value layout. Usually users are more concerned about the relationship rather than about how the data are related. It is a level of detail that should be abstract from the users. Also, if a table have many columns, searching for these buttons is inconvenient.

BACKGROUND OF INVENTION—OBJECTS AND ADVANTAGES

Accordingly, this invention uses a tree and preferably a grid next to the tree to display related table records (FIG. 1). The tree (1.1) displays table records' relationships. Only a string is used to label a tree node to identify the table record (1.3,

1.4). Users can click the expand-icon ("+") in front of a tree node to see any related table records. If users click any tree node, the corresponding table record data will be displayed in the grid (1.2). This way, users only need to run one SQL query to retrieve data from one table, and then expands the tree nodes to see any related records. Users can see the whole picture of the data relationships in the tree, and browse complete table record data in the grid.

With this invention, users only need to run one SQL query to retrieve data from one table, and then expands the tree nodes to see any related records.

SUMMARY

In accordance with the present invention a tree and a grid layout is used to visualize data and their relationships.

DRAWINGS—FIGURES

DETAILED DESCRIPTION—FIGS. 1, 2, 3, 4, 5—PREFERRED EMBODIMENT

Figure 1:
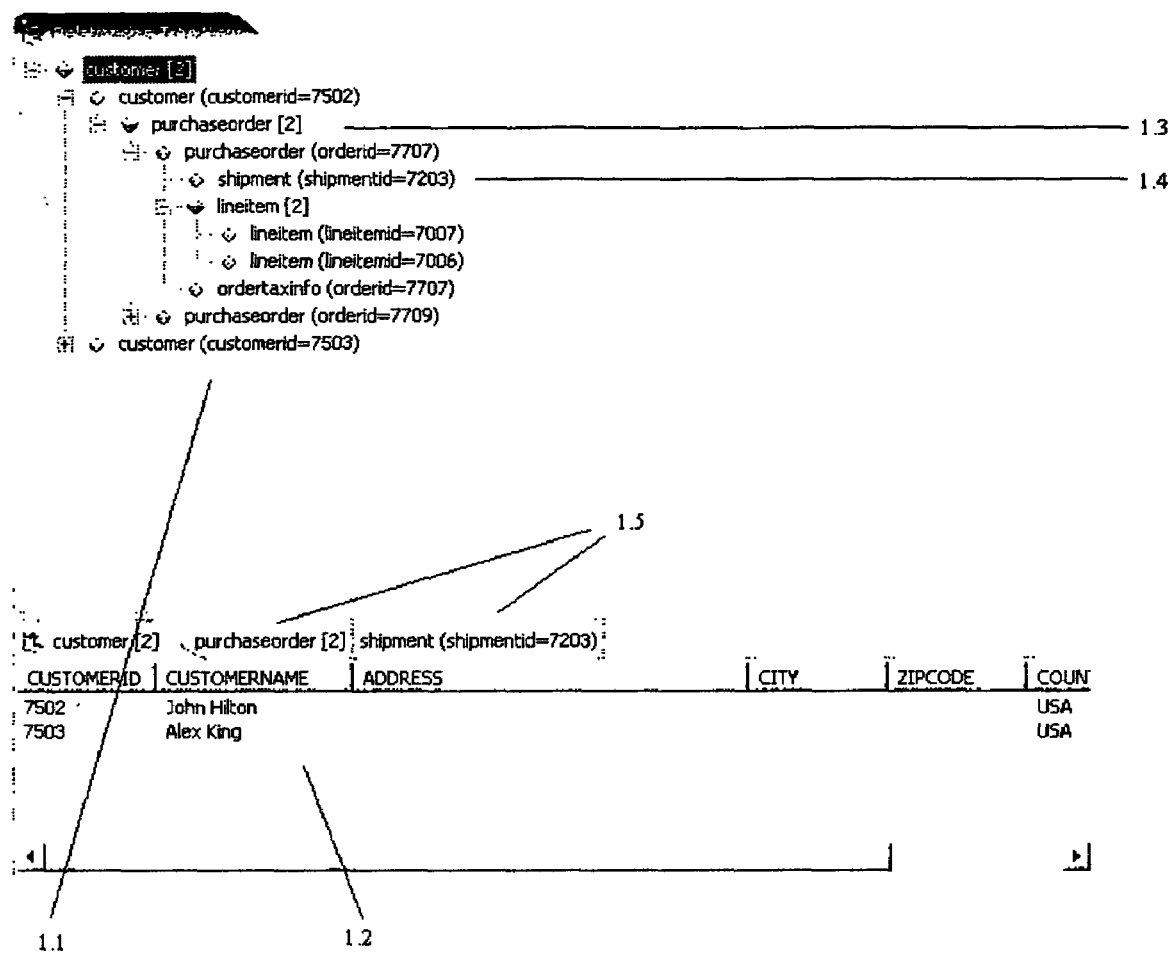
FIG. 1 shows that this invention uses a tree layout to display data relationship and a separate grid layout to display table record data.
Figure 2:
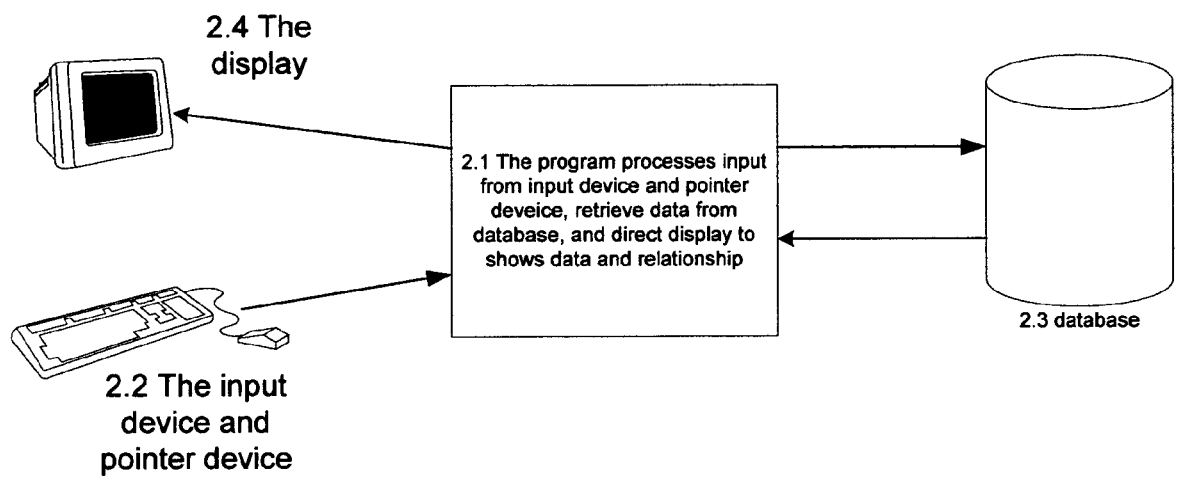
FIG. 2 shows how this invention connects to other related systems.
Figure 3:
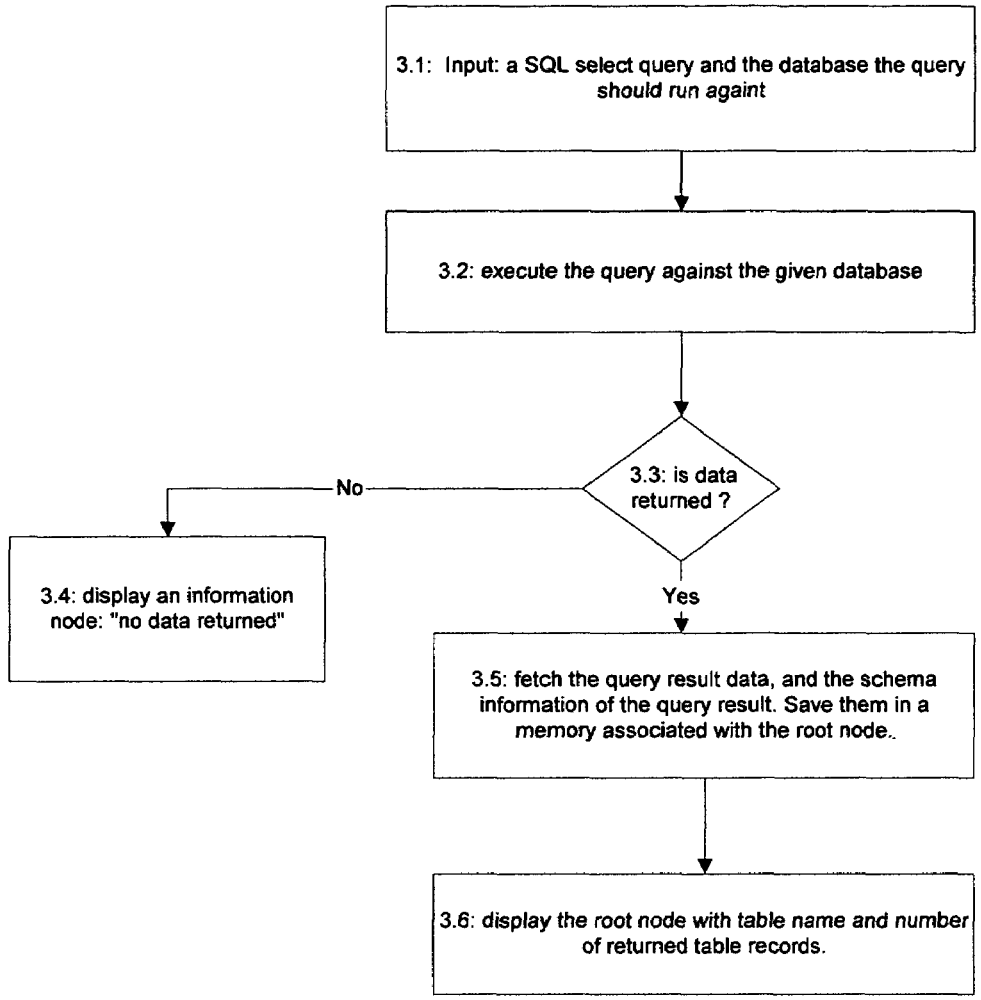
FIG. 3 shows the Flow chart when a user enters a SQL query, and how to retrieve data to populate the tree layout.
Figure 4:
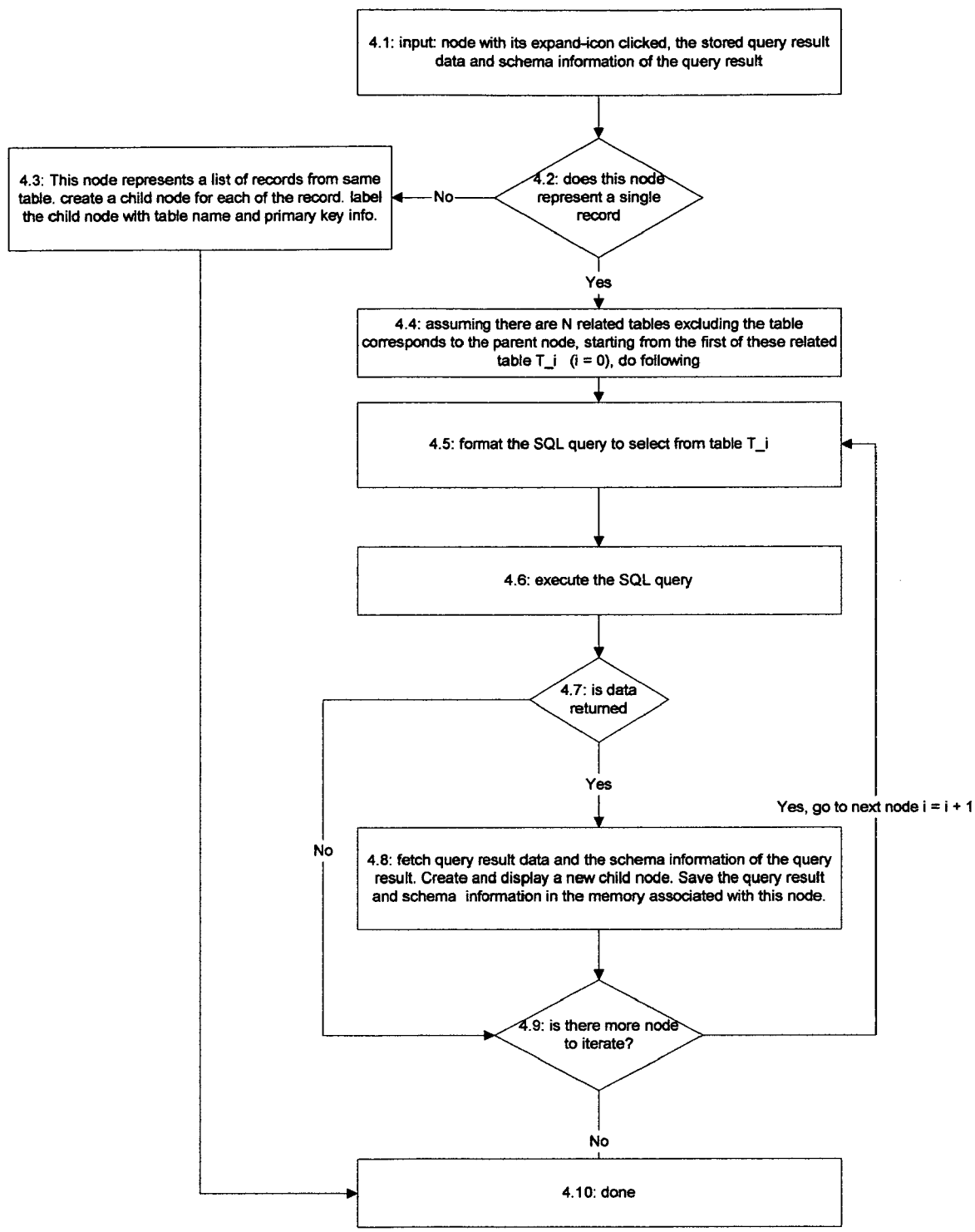
FIG. 4 shows the Flow chart when a user clicks the expand-icon ("+") of a tree node, and how to retrieve the related table data and display the child tree nodes.
Figure 5:
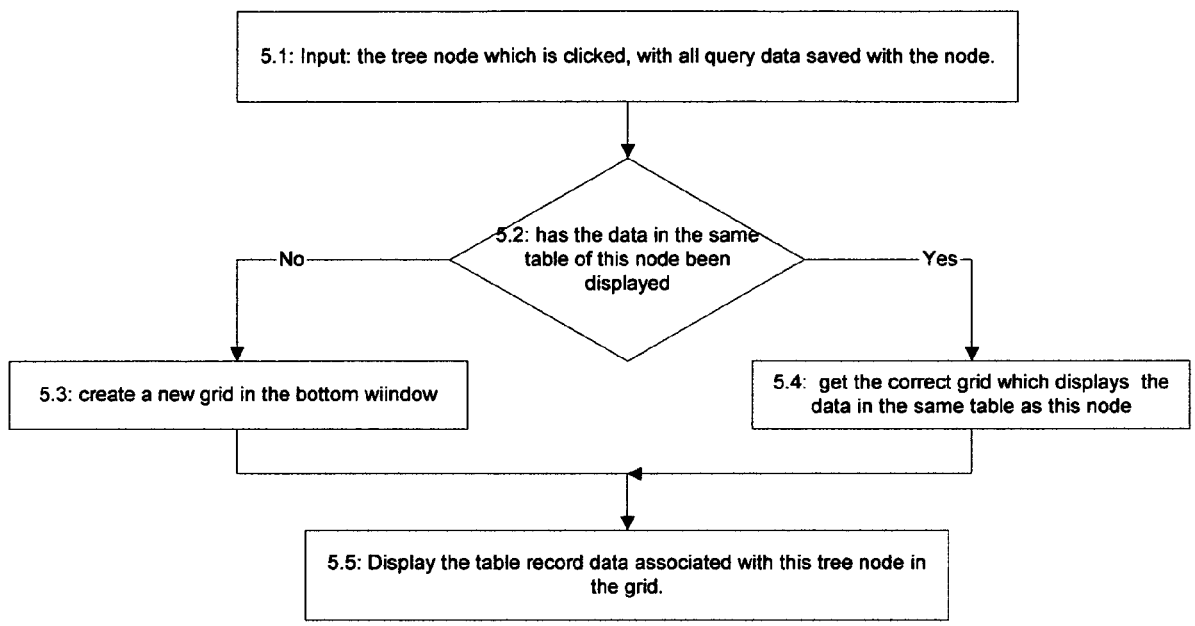
FIG. 5 shows the Flow chart when a user clicks a tree node in the tree layout, and how to retrieve data and display it in a grid layout.

A preferred embodiment of this invention is illustrated in FIG. 1 and FIG. 2, and how it is operated is illustrated in the Flow chart FIGS. 3, 4, 5.

In FIG. 1, 1.1 shows a tree layout with the query results represented as tree nodes. The related table records of a tree node are displayed as its child nodes. If there are multiple related records from the same table, an intermediate node is displayed (1.3) with the number of related records in a bracket. For any other node, the table name and the primary key information of the table is used to label the node (1.4). The bottom grid layout (1.2) shows the detailed table record data when users click a tree node. The bottom window could have multiple tabs (1.5), with each tab displays data coming from one table in a grid layout.

FIG. 2 shows the program (2.1) takes input from a input and a pointer device (2.2), processes a request, sends SQL queries to the database (2.3), retrieve query results and schema information from the database, process them, and then direct the display (2.4) to show the data and their relationships in the tree and grid layouts.

FIG. 3 shows the flow chart when users enter a SQL query, the database the query should run against (3.1), and ask the program to execute the query. An example SQL query could be "Select * from Customer". The program executes the SQL query against the given database (3.2). This step can be accomplished by making a call to a third part library. The embodiment is implemented in Java language. JDBC libraries for different database servers provide functions to execute selection query.

If the query returns no data, the program will just display an information message at root tree node in the tree layout to indicate no data is returned (3.4). If there are data returned, the program will fetch the data and the schema information of the query result (3.5). The schema information usually defined in the database itself, and can be retrieved by calling third party libraries, such as JDBC functions. All those fetched data should be saved in a memory associated with the root node for later retrieval. Now, the program will label the root node with the table name of in the SQL query and the number of returned records (3.6), for example, "customer[2]". An expand-icon ("+") is also displayed in front of the table node.

FIG. 4 shows how the program will create and display child nodes when users click the expand-icon ("+") icon in front of a tree node. As input, the program will have access to the given tree node, and all stored data in the memory associated with this node (4.1).

The program will first check whether the node represents a single record, or a list of records by checking how many records associated with the node. As a special case, the root node will always treated as a node representing a list of records.

For a node representing a list of records, the program will create a child node for each of these records, and copy corresponding table record data, and schema information to the memory associated with the newly created child node (4.3). The child node will be labeled with the table name, plus the primary key name value pair. As an example, a customer table record with primary key value "1", and primary key column name "customerid", will be labeled as "customer (customerid=1)."

If the node only represents one single record, the program will perform following operations for each of its related tables specified in the schema information, excluding the one represented by the parent node. This is to prevent the circular loops in the layout.

1. Format the query to select from the related table (4.5). This query can be created based on the data relationship information. For example, assuming to expand a node represents a table record from "customer" table, the schema information defines that the purchase order table records are related with customer table record by the customer id field. The customer id value for this node is "1". Therefore, the SQL query will be: "select * from purchaseorder where customerid=1".
2. Execute the query in above step 1 against the database for retrieving the root node (4.6). A call to JDBC library will be sufficient.
3. If there is no data returned, go to step 5.
4. If there are data returned, retrieve the query result and its schema information. Create a new child node, save the query result and schema information in the memory associated with this node (4.8). If there is only one record returned, label this node with corresponding table name and primary key information the same way as in 4.3 of FIG. 4. If there are multiple records returned, label this node with the table name and number of returned records, for example: "purchaseorder[3]".
5. After processing this node, check if there are more related tables. If yes, process next table starting from above step 1. If not, process is done.

FIG. 5 shows when users click a tree node itself, and how the program will display the table record data of this node in a grid layout. First, the program will check whether there is already a grid displaying the data in the same table as this node. If so, get the grid (5.4) and display the table record data in the grid layout (5.5). If there is no such grid, create a new grid (5.3), and display the table record data in the new grid (5.5).

ALTERNATIVE EMBODIMENTS

The preferred embodiment uses one tree layout, and a list of grid layouts to render the data and their relationships. These grid layouts are displayed under the tree layout. An alternative embodiment is to use only one grid layout to display table record data. Clicking any tree node will refresh the grid layout with the table record data of the tree node. The second alternative embodiment is to only display the tree layout, and when users click a tree node, display a second window that shows the table record data of the tree node in a grid layout.

CONCLUSION, RAMIFICATIONS, AND SCOPE

Therefore, the reader can see that using both tree and grid layouts to visualize data relationship of this invention can significantly simplify users' tasks to retrieve data from relational database. Users only need to execute one SQL query. The query result will be displayed in the tree layout as tree nodes. Users can expand the tree nodes to go to any level of related table records. Users can also click a tree node to display the corresponding table record data in a grid layout.

The tree layout shows the complete data relationship information, while the grid layout allows users to see any table record data of a tree node. The tree layout is much easier to navigate by just clicking the expand-icon in front of the tree nodes. In addition, since only a string is used to label a tree node, the tree layout is compact enough for easy navigation.

Although the description above contains much specificity, these should not be construed as limiting the scope of the invention but as merely providing illustrations of some of the presently preferred embodiments of this invention. For example, the programming language can be any language besides Java. The primary key and table relationship information can be stored in the database itself or in a separate data store.

Thus, the scope of this invention should be determined by the appended claims and their legal equivalents, rather than by the examples given.

What is claimed is:

1. A data processor controlled user-interactive display interface for displaying a set of related table records in multiple tables comprising:
    a processor;
    a memory device;
    means for displaying a tree having
       at least one root node representative of table records returned by a search query into a table from a data store; and
    a plurality of sub-nodes, each of which represents
    (1) a list of related table records in different tables of the record represented by its parent node if the parent node represents one table record; or
    (2) one table record from the list of records represented by its parent node if the parent node represents a list of table records;
    means for creating and executing a search queries to retrieve the related table records in different tables and presenting the retrieved related table records as sub-nodes in response to a user selection of an expand icon in front of a node representing one table record;
    wherein said related table records are retrieved based on foreign key constraints or user defined table relationships among multiple tables that can be in multiple databases;
    means for presenting a list of table records as sub-nodes in response to a user selection of an expand icon in front of a node representing a list of table records; and
    means for displaying the corresponding table records in a grid next to said tree in response to a user selection of said tree node.

2. A method for providing a data processor controlled user-interactive display interface for displaying a set of related table records in multiple tables comprising the Steps of:
    displaying a tree having
       at least one root node representative of table records returned by a search query into a table from a data store; and
    a plurality of sub-nodes, each of which represents
    (1) a list of related table records in different tables of the record represented by its parent node if the parent node represents one table record; or
    (2) one table record from the list of records represented by its parent node if the parent node represents a list of table records;
    creating and executing a search queries to retrieve the related table records in different tables and presenting the retrieved related table records as sub-nodes in response to a user selection of an expand icon in front of a node representing one table record;
    wherein said related table records are retrieved based on foreign key constraints or user defined table relationships among multiple tables that can be in multiple databases;
    presenting a list of table records as sub-nodes in response to a user selection of an expand icon in front of a node representing a list of table records; and
    means for displaying the corresponding table records in a grid next to said tree in response to a user selection of said tree node.

3. The display interface of claim 1, wherein said data store is a relational database.

4. The method of claim 2, wherein said data store is a relational database.

* * * * *